(12) United States Patent
McCall et al.

(10) Patent No.: US 10,963,404 B2
(45) Date of Patent: Mar. 30, 2021

(54) HIGH BANDWIDTH DIMM

(71) Applicant: Intel Corporation, Santa Clara, CA (US)

(72) Inventors: James A. McCall, Portland, OR (US); Rajat Agarwal, Portland, OR (US); George Vergis, Portland, OR (US); Bill Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/017,430

(22) Filed: Jun. 25, 2018

(65) Prior Publication Data
US 2019/0042499 A1     Feb. 7, 2019

(51) Int. Cl.
*G06F 13/28*     (2006.01)
*G06F 13/16*     (2006.01)

(52) U.S. Cl.
CPC .......... *G06F 13/1684* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 6,446,158 B1 | 9/2002 | Karabatsos | |
| 6,854,042 B1 | 2/2005 | Karabatsos | |
| 7,209,397 B2 * | 4/2007 | Ware | G06F 13/1684 365/194 |
| 7,650,457 B2 * | 1/2010 | Ruckerbauer | G06F 11/1012 365/51 |
| 7,861,014 B2 | 12/2010 | Gower et al. | |
| 8,806,116 B2 | 8/2014 | Karamcheti et al. | |
| 9,368,174 B2 * | 6/2016 | Nishio | G11C 29/028 |
| 9,811,263 B1 * | 11/2017 | Teh | G06F 3/061 |
| 2006/0136618 A1 * | 6/2006 | Gower | G06F 13/4243 710/52 |
| 2006/0262586 A1 | 11/2006 | Solomon et al. | |
| 2007/0162715 A1 * | 7/2007 | Tagawa | G06F 13/1647 711/158 |
| 2009/0161475 A1 * | 6/2009 | Kim | G11C 7/222 365/233.1 |
| 2009/0254689 A1 * | 10/2009 | Karamcheti | G06F 12/0246 710/301 |
| 2012/0206165 A1 | 8/2012 | Ferolito et al. | |
| 2014/0032984 A1 * | 1/2014 | Lee | G11C 29/08 714/718 |
| 2014/0192583 A1 | 7/2014 | Rajan et al. | |
| 2015/0149735 A1 | 5/2015 | Nale et al. | |
| 2015/0302904 A1 * | 10/2015 | Yoon | G11C 5/04 711/105 |
| 2015/0331817 A1 * | 11/2015 | Han | G06F 3/0683 710/308 |
| 2016/0110102 A1 * | 4/2016 | Lee | G06F 13/1694 711/103 |
| 2016/0147678 A1 | 5/2016 | Nale | |
| 2016/0291894 A1 | 10/2016 | Yeung et al. | |
| 2016/0314085 A1 * | 10/2016 | Ware | G06F 13/1673 |
| 2016/0350002 A1 | 12/2016 | Vergis et al. | |
| 2017/0092379 A1 * | 3/2017 | Kim | G06F 3/0613 |

(Continued)

*Primary Examiner* — Michael Sun
(74) *Attorney, Agent, or Firm* — Compass IP Law PC

(57) ABSTRACT

A DIMM is described. The DIMM includes circuitry to simultaneously transfer data of different ranks of memory chips on the DIMM over a same data bus during a same burst write sequence.

24 Claims, 10 Drawing Sheets

(56) References Cited

U.S. PATENT DOCUMENTS

| | | |
|---|---|---|
| 2017/0160928 A1* | 6/2017 | Jaffari .................... G06F 3/061 |
| 2017/0168746 A1 | 6/2017 | Kwon et al. |
| 2017/0177496 A1 | 6/2017 | Han et al. |
| 2017/0249991 A1 | 8/2017 | Han et al. |
| 2017/0315914 A1 | 11/2017 | Muralimanohar et al. |
| 2018/0225235 A1 | 8/2018 | Lee |
| 2018/0292991 A1 | 10/2018 | Walker |
| 2019/0042162 A1* | 2/2019 | McCall ................ G06F 3/0679 |
| 2019/0042500 A1* | 2/2019 | Agarwal ............ G06F 13/1684 |

\* cited by examiner

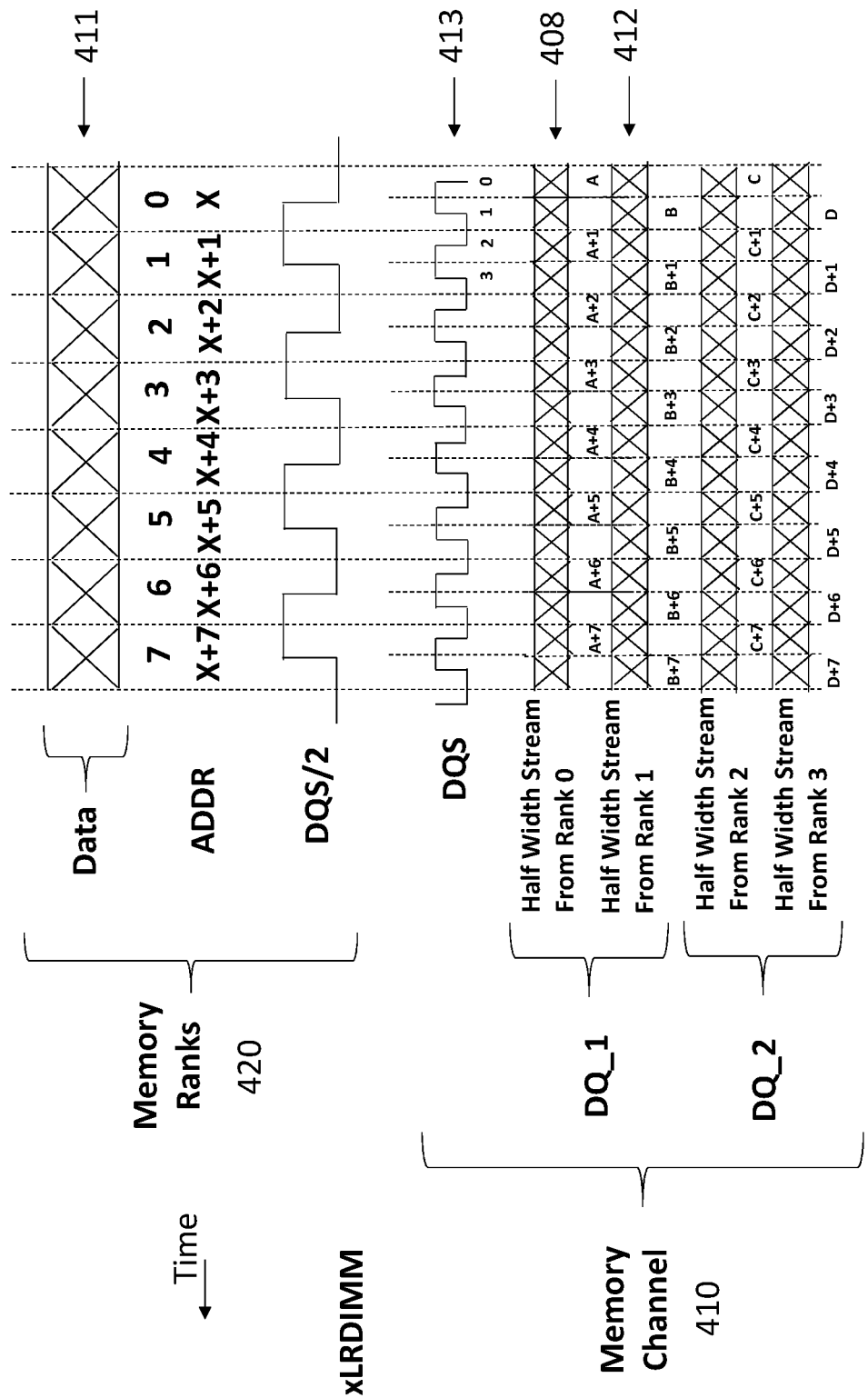

HIGH BANDWIDTH DIMM

FIELD OF INVENTION

The field of invention pertains generally to a high bandwidth DIMM.

BACKGROUND

The performance of computing systems is highly dependent on the performance of their system memory. Generally, however, increasing memory channel capacity and memory speed can result in challenges concerning the power consumption of the memory channel implementation. As such, system designers are seeking ways to increase memory channel capacity and bandwidth while keeping power consumption in check.

FIGURES

A better understanding of the present invention can be obtained from the following detailed description in conjunction with the following drawings, in which.

Figure 4A:
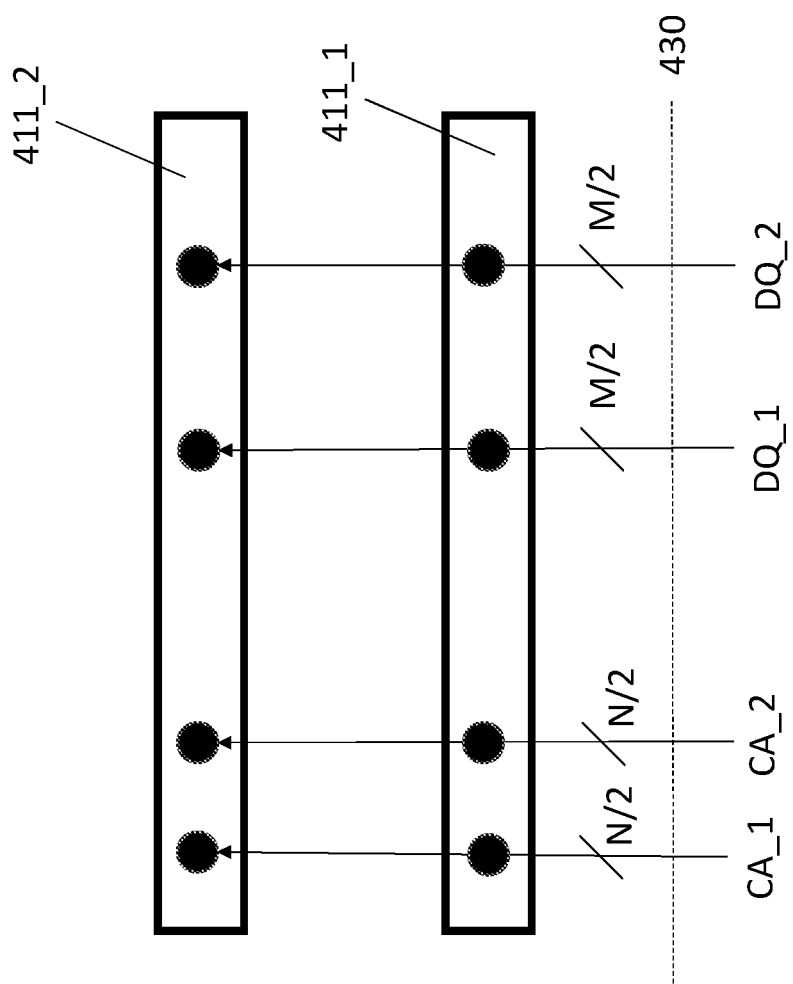
FIG. 4a shows an emerging layout for a memory channel.
Figure 4B:
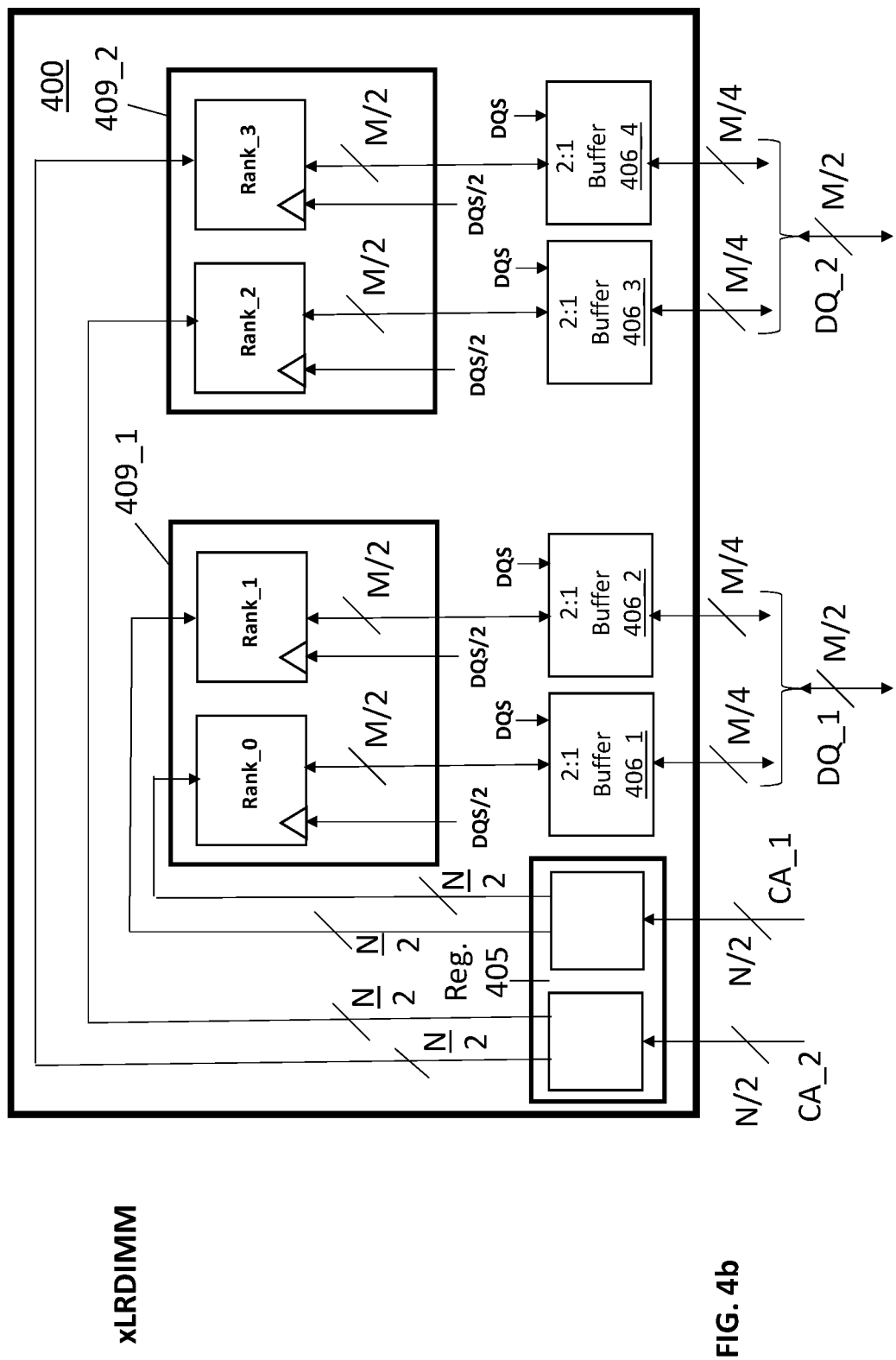
FIG. 4b shows an embodiment of a high bandwidth DIMM.
Figure 4D:
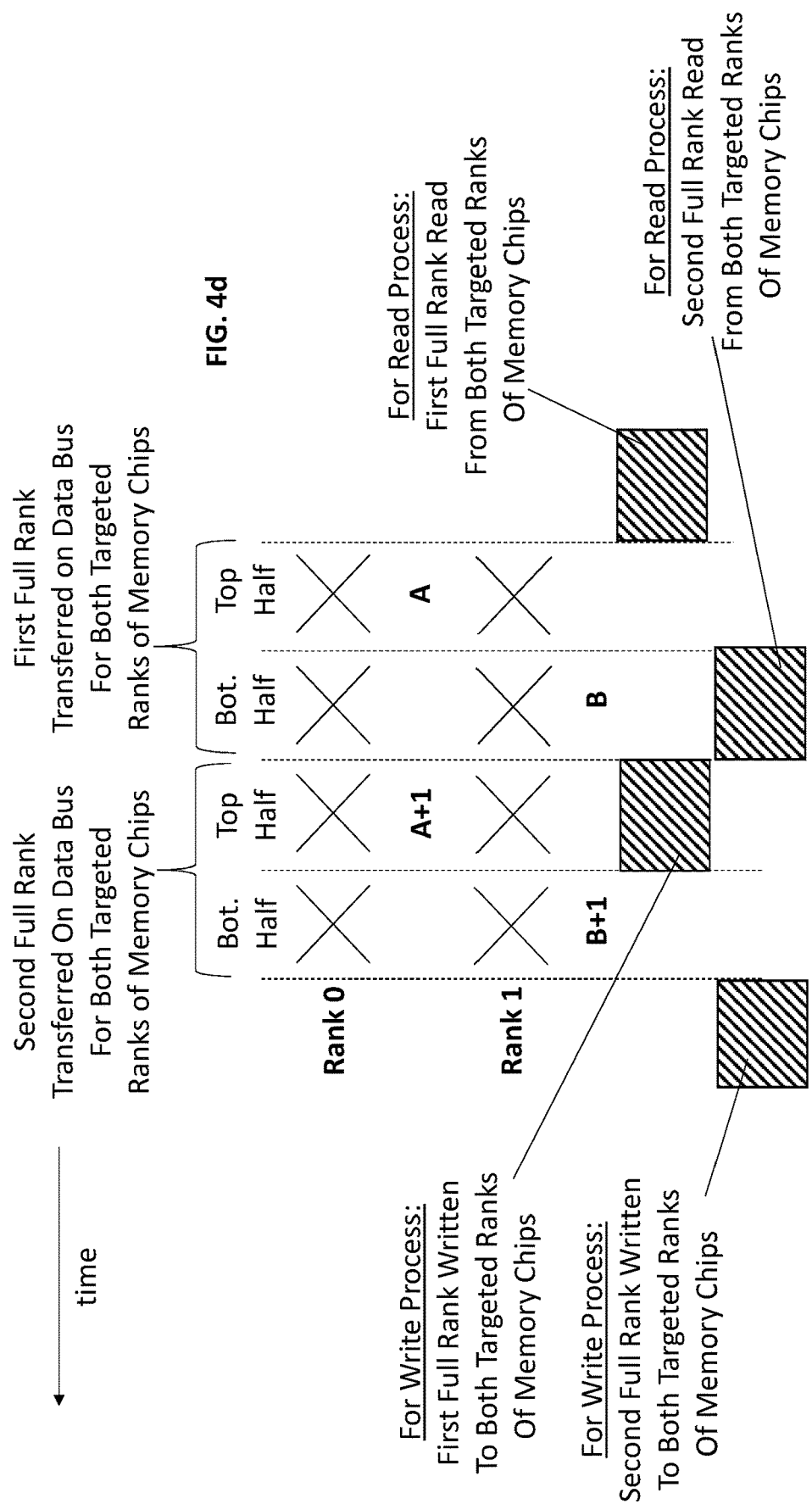
Figure 5:
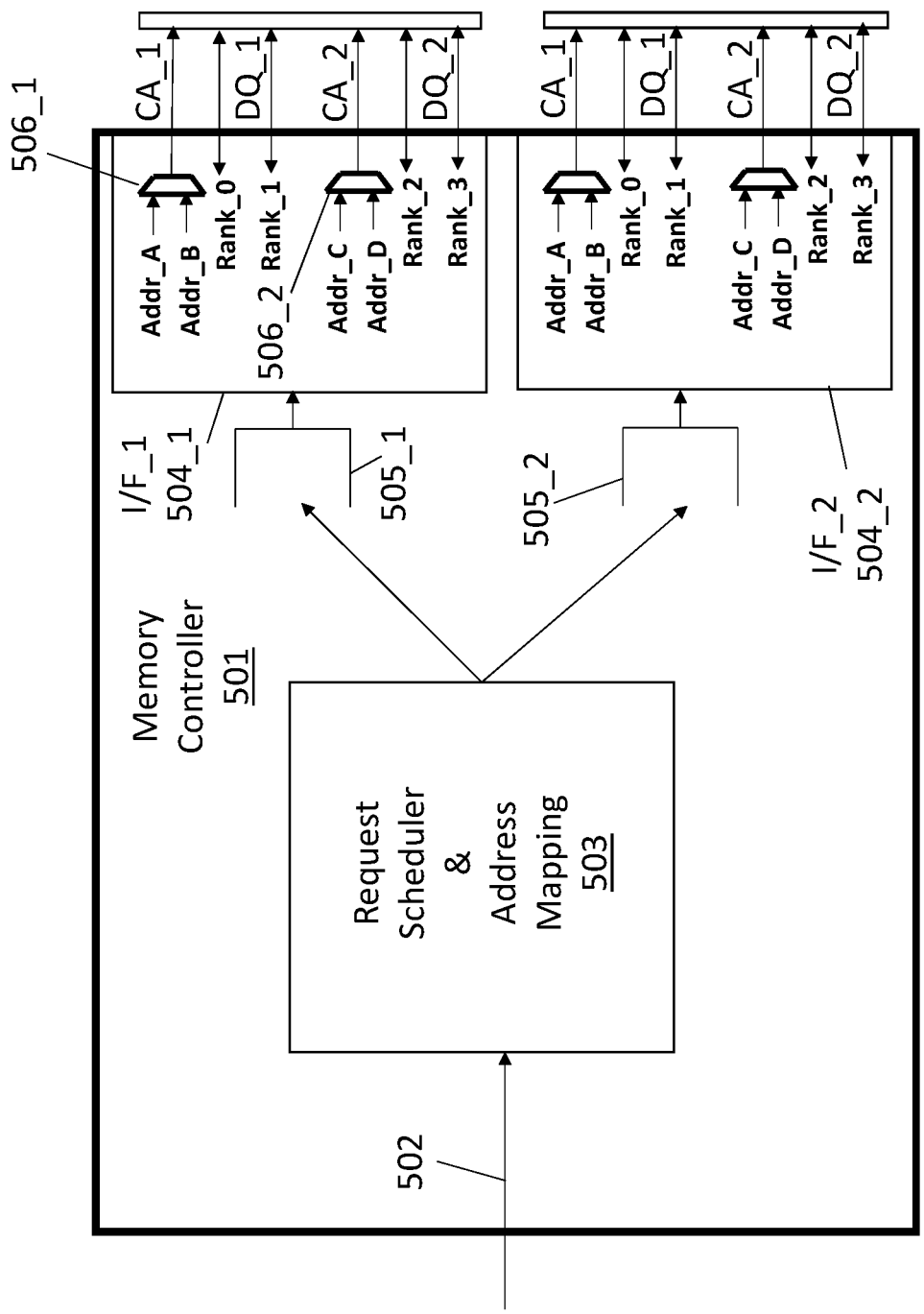
Figure 6:
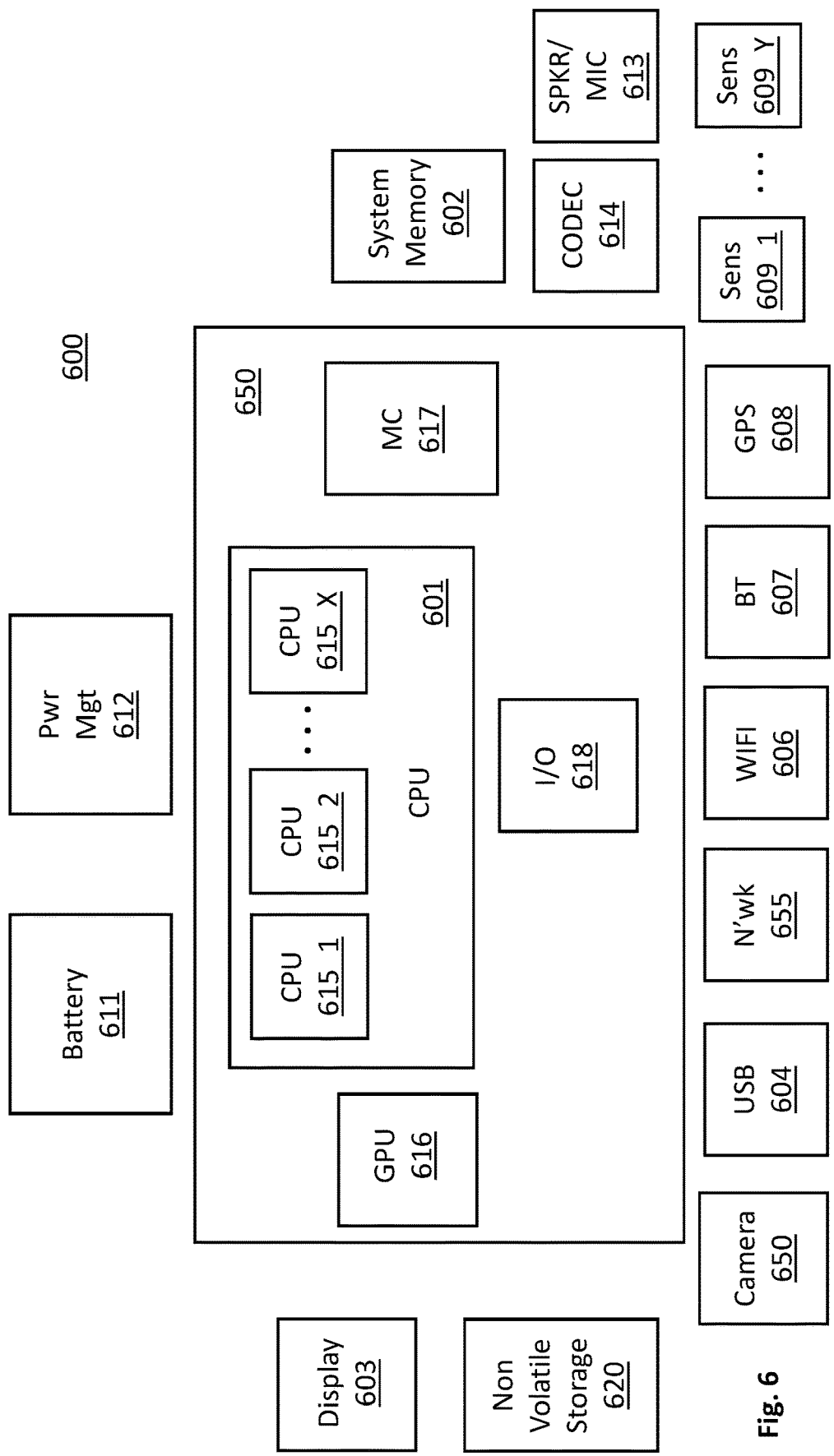

FIG. 4c compares timing of a traditional memory channel and an embodiment of the timing of the high bandwidth DIMM embodiment of FIG. 4b;

FIG. 4d shows additional information of the timing of FIG. 4c;

FIG. 5 shows a memory controller to interface with the high bandwidth DIMM embodiment of FIG. 4b;

FIG. 6 shows a computing system.

DETAILED DESCRIPTION

As is known in the art, main memory (also referred to as "system memory") in high performance computing systems, such as high performance servers, are often implemented with dual in-line memory modules (DIMMs) that plug into a memory channel. Here, multiple memory channels emanate from a main memory controller and one or more DIMMs are plugged into each memory channel. Each DIMM includes a number of memory chips that define the DIMM's memory storage capacity. The combined memory capacity of the DIMMs that are plugged into the memory controller's memory channels corresponds to the system memory capacity of the system.

Figure 1:
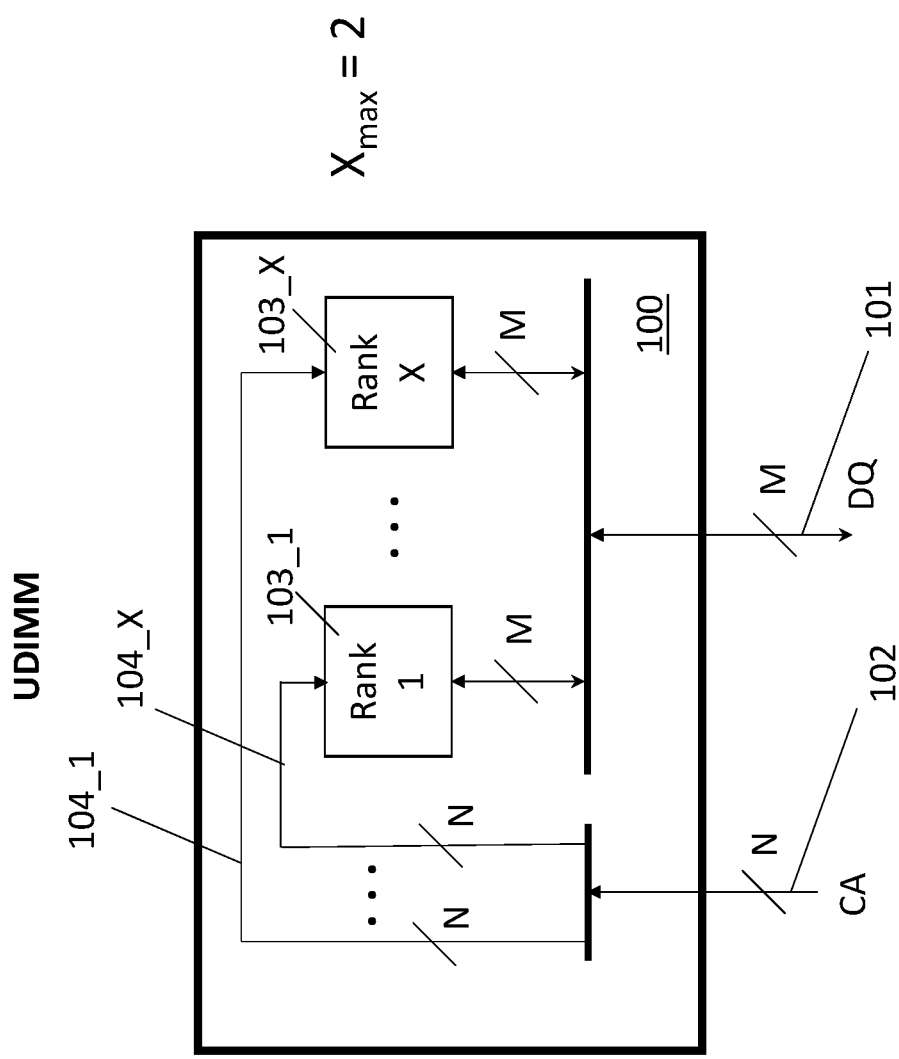
FIG. 1 shows a first prior art DIMM.

Over time the design and structure of DIMMs has changed to meet the ever increasing need of both memory capacity and memory channel bandwidth. FIG. 1 shows a traditional DIMM approach. As observed in FIG. 1, a single "unbuffered" DIMM (UDIMM) 100 has its memory chips directly coupled to the wires of the memory channel bus 101, 102. The UDIMM 100 includes a number of memory chips sufficient to form a data width of at least one rank 103. A rank corresponds to the width of the data bus which generally corresponds to the number of data signals and the number of ECC signals on the memory channel.

As such, the total number of memory chips used on a DIMM is a function of the rank size and the bit width of the memory chips. For example, for a rank having 64 bits of data and 8 bits of ECC, the DIMM can include eighteen "X4" (four bit width) memory chips (e.g., 16 chips×4 bits/chip=64 bits of data plus 2 chips×4 bits/chip to implement 8 bits of ECC), or, nine "X8" (eight bit width) memory chips (e.g., 8 chips×8 bits/chip=64 bits of data plus 1 chip×8 bits/chip to implement 8 bits of ECC).

For simplicity, when referring to FIG. 1 and the ensuing figures, the ECC bits may be ignored and the observed rank width M simply corresponds to the number of data bits on the memory bus. That is, e.g., for a data bus having 64 data bits, the rank=M=64.

UDIMMs traditionally only have storage capacity for two separate ranks of memory chips, where, one side of the DIMM has the memory chips for a first rank and the other side of the DIMM has the memory chips for a second rank. Here, a memory chip has a certain amount of storage space which correlates with the total number of different addresses that can be provided to the memory chip. A memory structure composed of the appropriate number of memory chips to interface with the data bus width (eighteen X4 memory chips or nine X8 memory chips in the aforementioned example) corresponds to a rank of memory chips. A rank of memory chips can therefore separately store a number of transfers from the data bus consistently with its address space. For example, if a rank of memory chips is implemented with memory chips that support 256M different addresses, the rank of memory chips can store the information of 256M different bus transfers.

Notably, the memory chips used to implement both ranks of memory chips are coupled to the memory channel 101, 102 in a multi-drop fashion. As such, the UDIMM 100 can present as much as two memory chips of load to each wire of the memory channel data bus 101 (one memory chip load for each rank of memory chips).

Similarly, the command and address signals for both ranks of memory chips are coupled to the memory channel's command address (CA) bus 102 in multi-drop form. The control signals that are carried on the CA bus 102 include, to name a few, a row address strobe signal (RAS), column address strobe signal (CAS), a write enable (WE) signal and a plurality of address (ADDR) signals. Some of the signals on the CA bus 102 typically have stringent timing margins. As such, if more than one DIMM is plugged into a memory channel, the loading that is presented on the CA bus 102 can sufficiently disturb the quality of the CA signals and limit the memory channel's performance.

Figure 2:
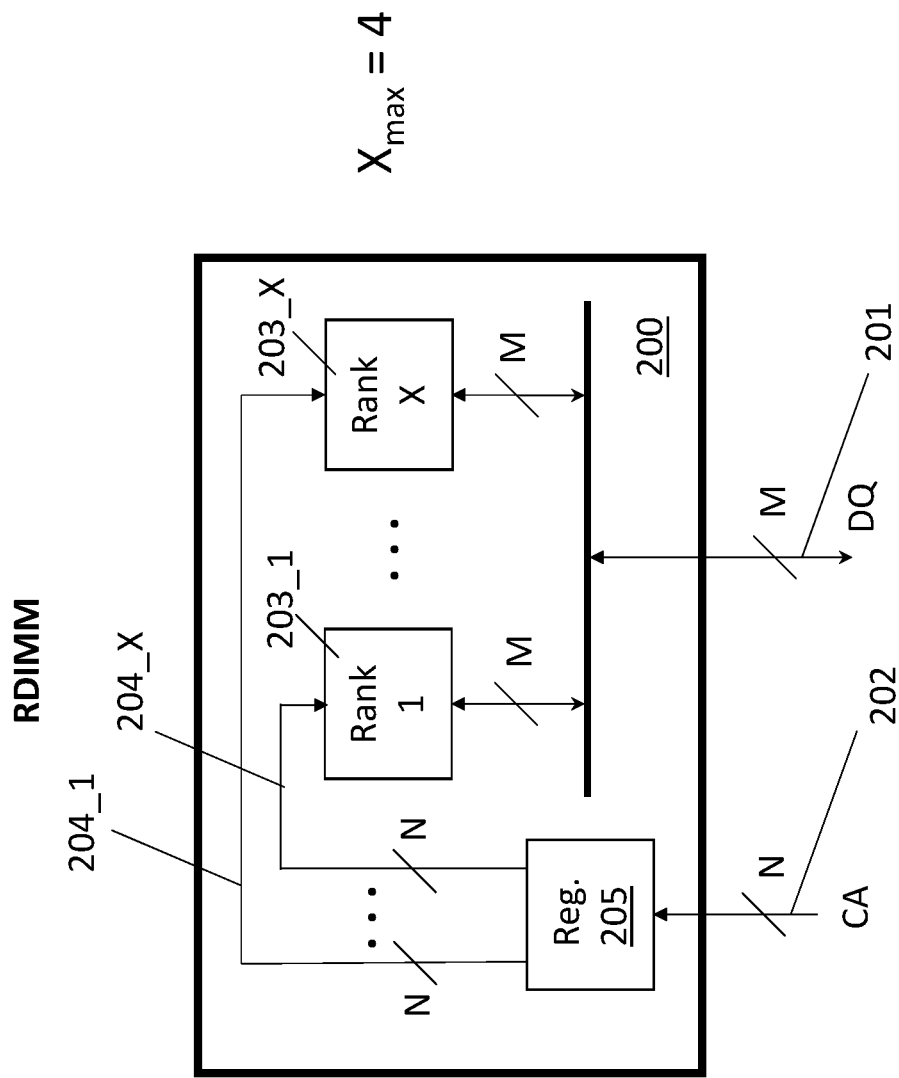
FIG. 2 shows a second prior art DIMM.

FIG. 2 shows a later generation DIMM, referred to as a register DIMM 200 (RDIMM), that includes register and redrive circuitry 205 to address the aforementioned limit on memory channel performance presented by loading of the CA bus 202. Here, the register and redrive circuitry 205 acts as a single load per DIMM on each CA bus 202 wire as opposed to one load per rank of memory chips (as with the UDIMM). As such, whereas a nominal dual rank UDIMM will present one load on each wire of the memory channel's CA bus 202 for memory chip on the UDIMM (because each memory chip on the UDIMM is wired to the CA bus 202), by contrast, a dual rank RDIMM with an identical set of memory chips, etc. will present only one chip load on each of the memory channel's CA bus 202 wires.

In operation, the register and redrive circuitry 205 latches and/or redrives the CA signals from the memory channel's CA bus 202 to the memory chips of the particular rank of memory chips on the DIMM that the CA signals are specifically being sent to. Here, for each memory access (read or write access with corresponding address) that is issued on the memory channel, the corresponding set of CA signals include chip select signals (CS) and/or other signals that specifically identify not only a particular DIMM on the channel but also a particular rank on the identified DIMM that is targeted by the access. The register and redrive circuitry 205 therefore includes logic circuitry that monitors these signals and recognizes when its corresponding DIMM is being accessed. When the logic circuitry recognizes that its DIMM is being targeted, the logic further resolves the CA signals to identify a particular rank of memory chips on the DIMM that is being targeted by the access. The register and redrive circuitry then effectively routes the CA signals that are on the memory channel to the memory chips of the specific targeted rank of memory chips on the DIMM 200.

A problem with the RDIMM 200, however, is that the signal wires for the memory channel's data bus 201 (DQ) are also coupled to the DIMM's ranks of memory chips 203_1 through 203_X in a multi-drop form. That is, for each rank of memory chips that is disposed on the RDIMM, the RDIMM will present one memory chip load on each DQ signal wire. Thus, similar to the UDIMM, the number of ranks of memory chips that can be disposed on an RDIMM is traditionally limited (e.g., to two ranks of memory chips) to keep the loading on the memory channel data bus 201 per RDIMM in check.

Figure 3A:
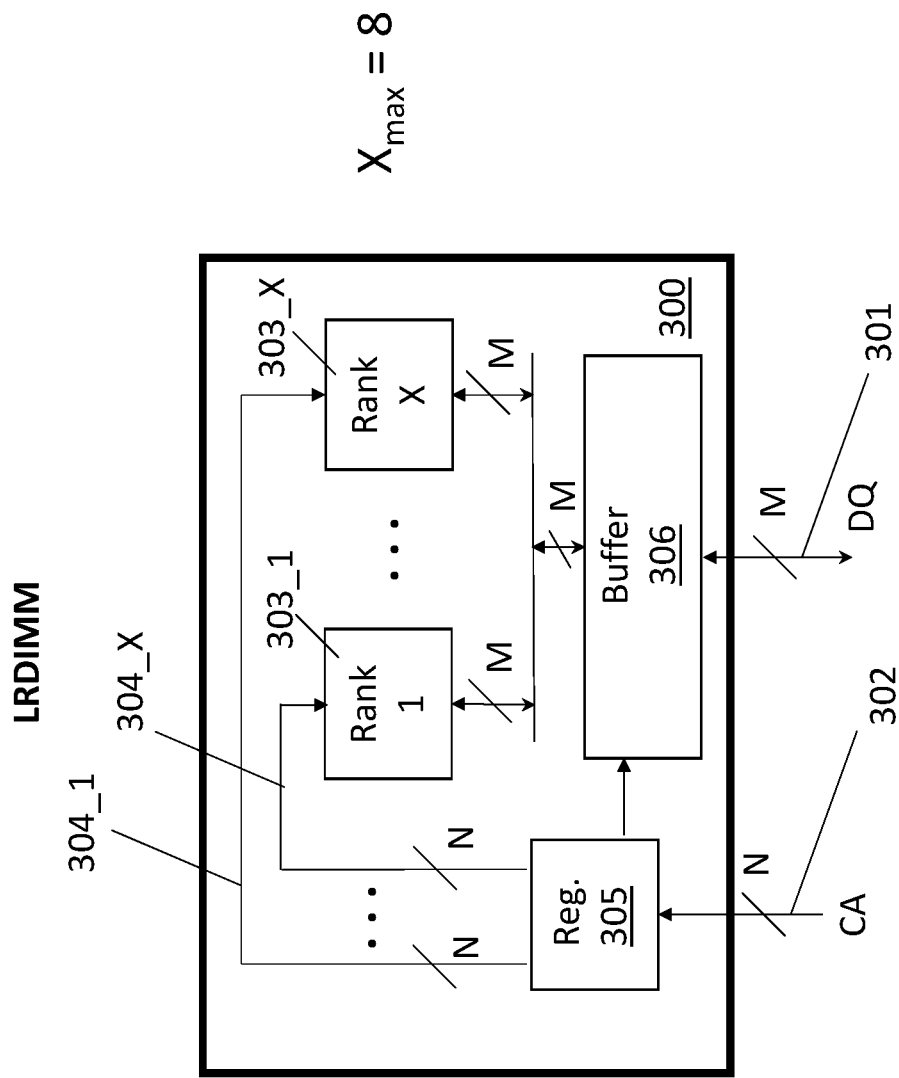
FIG. 3a shows a third prior art DIMM.

FIG. 3a shows an even later generation DIMM, referred to as a load reduced DIMM (LRDIMM) 300, in which both the CA bus wires 302 and the DQ bus wires 301 are presented with only a single load by the LRDIMM 300. Here, similar to the register and redrive circuitry of the RDIMM, the LRDIMM includes buffer circuitry 306 that stores and forwards data that is to be passed between the memory channel data bus 301 and the particular rank of memory chips 303 that is being targeted by an access. The register and redrive circuitry 305 activates whichever rank of memory chips is targeted by a particular access and the data associated with that access appears at the "back side" of the buffer circuitry 306.

With only a single point load for both the DQ and CA wires 301, 302 on the memory channel, the memory capacity of the LRDIMM 300 is free to expand its memory storage capacity beyond only two ranks of memory chips (e.g. four ranks on a single DDR4 DIMM). With more ranks of memory chips per DIMM and/or a generalized insensitivity to the number of memory chips per DIMM (at least from a signal loading perspective), new memory chip packaging technologies that strive to pack more chips into a volume of space have received heightened attention is recent years. For example, stacked chip packaging solutions can be integrated on an LRDIMM to form, e.g., a 3 Dimensional Stacking (3DS) LRDIMM.

Even with memory capacity per DIMM being greatly expanded with the emergence of LRDIMMs, memory channel bandwidth remains limited with LRDIMMs because multiple LRDIMMs can plug into a same memory channel. That is, a multi-drop approach still exists on the memory channel in that more than one DIMM can couple to the CA and DQ wires of a same memory channel.

Figure 3B:
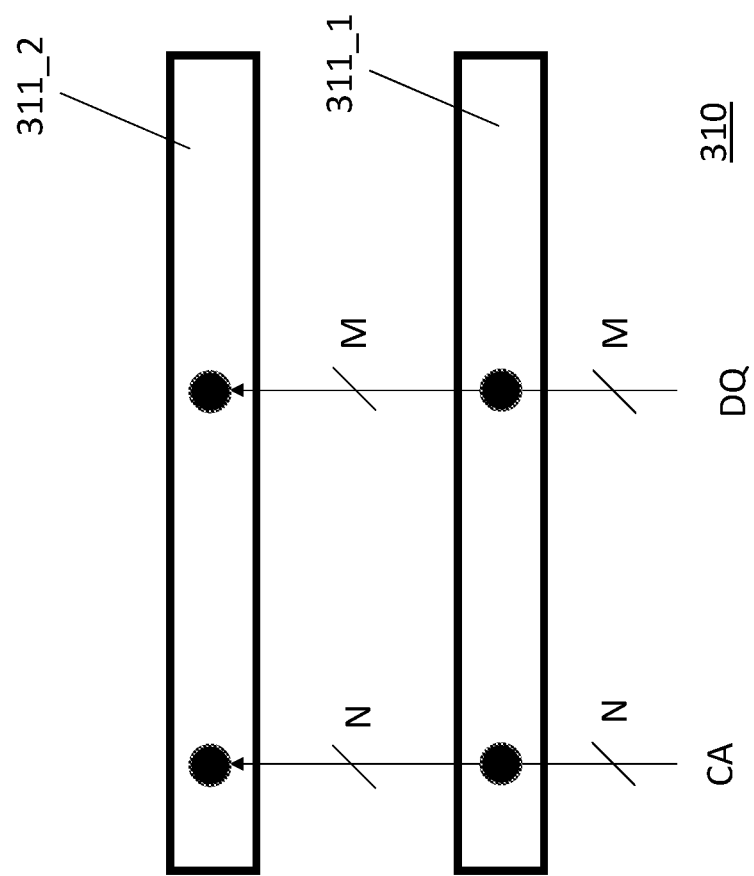
FIG. 3b shows a first layout for a memory channel that interfaces with DIMMs of FIG. 3.

Here, FIG. 3b shows a high performance memory channel layout 310 in which two DIMM slots 311_1, 311_2 are coupled to a same memory channel. The particular layout of FIG. 3b is consistent with the Joint Electron Device Engineering Council (JEDEC) Double Date Rate 4 (DDR4) memory standard. As can be seen from the layout 310 of FIG. 3b, if a respective LRDIMM is plugged into each of the two slots 311_1, 311_2, each CA bus wire and DQ bus wire will have two loads (one from each LRDIMM). If the loading could be further reduced, the timing margins of the CA and DQ signals could likewise be increased, which, in turn, would provide higher memory channel frequencies and corresponding memory channel bandwidth (read/write operations could be performed in less time).

A next generation JEDEC memory interface standard, referred to as DDR5, is taking the approach of physically splitting both the CA bus and the DQ bus into two separate multi-drop busses as depicted in FIG. 4a. Here, comparing FIG. 3b with FIG. 4a, note that whereas the layout of FIG. 3b depicts a single N bit wide CA bus that is multi-dropped to two DIMM slots 311_1, 311_2 and a single M bit wide DQ data bus that is also multi-dropped to the two DIMM slots 311_1, 311_2; by contrast, the DDR5 layout of FIG. 4a consists of two separate N/2 bit wide CA busses that are multi-dropped to two DIMM slots 411_1, 411_2 and two separate M/2 bit wide DQ data busses that are multi-dropped to the DIMM slots 411_1, 411_2.

Again, for simplicity, ECC bits are ignored and M=64 in both FIGS. 3b and 4a for DDR4 and DDR5 implementations, respectively. As such, whereas DDR4 has a single 64 bit wide data bus, by contrast, DDR5 has two 32 bit wide data busses (DQ_1 and DQ_2). A "rank" in a DDR5 system therefore corresponds to 32 bits and not 64 bits (the width of both the DQ_1 and DQ_2 data busses is M/2=64/2=32 bits). Likewise, a rank of memory chips for a DDR5 system accepts 32 bits of data from a sub-channel in a single transfer rather than 64 as in DDR4.

FIG. 4b shows an embodiment of a high bandwidth LRDIMM 400 (xLRDIMM) that can not only concurrently handle data transfers over both the DQ_1 and DQ_2 data busses but can also concurrently handle data transfers between two different ranks over a same one of the data busses. That is, the high bandwidth DIMM of FIG. 4b can concurrently handle data transfers between first, second, third and fourth ranks on the DIMM.

As observed in FIG. 4b, the DIMM 400 includes a first group of ranks 409_1 (rank_0 and rank_1) and a second group of ranks 409_2 (rank_2 and rank_3). According to one embodiment, the first group of ranks 409_1 are physically layed out on one end of the DIMM (e.g., the "left" end of the DIMM), where, the memory chips of one of the ranks of the group 409_1 (e.g., rank_0) are disposed on one side of the DIMM (e.g., the "front" side) and the memory chips of the other one of the ranks of the group 409_1 (e.g., rank_1) are disposed on the other side of the DIMM (e.g., the "back" side).

Likewise, the second group of ranks 409_2 are physically layed out on the other end of the DIMM (e.g., the "right" end of the DIMM), where, the memory chips of one of the ranks of the group 409_2 (e.g., rank_2) are disposed on one side of the DIMM (e.g., the "front" side) and the memory chips of the other one of the ranks of the group 409_3 (e.g., rank_3) are disposed on the other side of the DIMM (e.g., the "back" side).

Notably, the ranks (rank_0, rank_1) of the first memory group 409_1 are coupled to the first data bus DQ_1 and the ranks (rank_2, rank_3) of the second memory group 409_2 are coupled to the second data bus DQ_2. With the DQ_1 and DQ_2 bus interfaces being separately coupled to their own respective ranks of memory chips, the DIMM 400 is able to concurrently handle bus transfers on the two different data busses DQ_1, DQ_2. Here, each of the data busses DQ_1, DQ_2 has its own associated CA channels CA_1, CA_2 so that not only different target addresses can be concurrently targeted over the DQ_1 and DQ_2 data busses, but also, different operation types can be concurrently executed over the DQ_1 and DQ_2 busses. For example, while the DQ_1 data bus is supporting a read transfer the DQ_2 data bus may be supporting a write transfer (and/or vice-versa, the DQ_1 data bus may support a write transfer while the DQ_2 data bus is supporting a read transfer).

Significantly, the DIMM 400 is able to simultaneously handle data transfers associated with two different ranks of a same rank group over a same data bus during a same time window. For example, over a same read burst read or write burst time window, data associated with rank_0 can be simultaneously transmitted with data from rank_1 on data bus DQ_1. Likewise, over a concurrent time period, data from rank_2 can be simultaneously transmitted with data from rank_3 on data bus DQ_2 (e.g., during a burst read or write window on data bus DQ_2). As such, over a same time window, data associated with all four ranks (rank_0 through rank_3) can be simultaneously transmitted across data busses DQ_1 and DQ_2.

Moreover, in various embodiments, a full rank's worth of data is accessed at the individual ranks for both read and write operations. However, buffer devices 406 operate at, e.g., twice the speed of the memory chips of the individual ranks and therefore are able to perform 2:1 multiplexing (e.g., in a store and forward fashion) so as to effectively reduce the data width by half. The additional half data width on the DQ data bus that is "freed up" by the half data width reduction can be consumed with the data of the other rank that is coupled to the same data bus.

For example, referring to FIG. 4b, during a read operation, a full rank's worth of data may be read from both rank_0 and rank_1, respectively. As observed in FIG. 4c, the reads from both ranks will generate M/2=32 bits of data (ignoring ECC) from both ranks, respectively. The 32 bits of data read from rank_0 are buffered into buffer 406_1 and the 32 bits of data read from rank_1 are buffered into buffer 406_2. According to prior art DIMM buffering approaches in which the buffers operate at the same speed as the memory devices, any 32 bits read from a ranks is immediately presented on the data bus in its entirety.

However, that is not feasible in the DIMM design 400 of FIG. 4b because the concurrent reads from both ranks (rank_0 and rank_1) generate 64 total bits and the DQ_1 data bus over which their data is to be transmitted is only 32 bits wide. Instead, in the design of the DIMM 400 of FIG. 4b, the buffers 406_1 and 406_2 operate at twice the speed of the memory devices. As a consequence, the buffers 406_1, 406_2 have two transmission cycles on the DQ_1 data bus for every read cycle of their corresponding memory. As such, each buffer 406_1, 406_2 is respectively coupled to only M/4=16 bits of the DQ_1 bus, and, transmits two cycles of 16 bits on its 16 bit half of the DQ_1 bus for every 32 bit read access of its corresponding memory.

Said another way, the buffers 406_1, 406_2 implement a 2:1 store-and-forward multiplexing scheme in the direction from the memory chips to the data bus during a memory read. Here, all 32 bits from a read of rank_0 is entered into buffer 406_1 and then a "top half" of 16 of these bits is first transmitted onto the DQ_1 bus and then a "bottom half" of the remaining 16 bits is next transmitted on the DQ_1 bus. The buffer 406_2 for the sibling rank_1 operates identically but transmits its 16 bits on the other 16 bits of the DQ_1 bus that buffer 406_1 does not transmit on. As such, data from both rank_0 and rank_1 are simultaneously transmitted on the DQ_1 bus in 16 bit chunks apiece.

The buffers 406_3 and 406_4 for ranks rank_2 and rank_3 can behave similarly over a same time period which results in the DIMM 400 being able to concurrently send read data from all four ranks over a same time window. Notably, while read transfers are occurring on one of the data busses, write transfers may be occurring on the other of the buffers. In the case of write operations, the buffers 406 implement a reverse store-and-forward multiplexing process. That is, for every write cycle of 32 bits into a rank of memory chips, the rank's corresponding buffer receives two transfers of 16 bits from the data bus.

FIG. 4c shows an embodiment of the timing of the DIMM 400 of FIG. 4b. Here, inset 410 shows the timing of signals associated with the memory channel that the DIMM plugs into and inset 420 shows the timing of the signals associated with the memory ranks. Comparing the signals of the two insets 410, 420, note that the data 411 that is clocked in/out of the memory ranks is clocked at half the rate at which the memory channel's data bus operates. That is, the clock that clocks the memory chips (DQS/2) is half the frequency of the clock that clocks data transfers on the DQ_1 and DQ_2 data busses (DQS). As can be seen, over a same period, the DQ_1 bus is composed of half width (16 bit) data streams 408, 412 associated with rank_0 and rank_1. Likewise, over the same time period, the DQ_2 bus is composed of half width (16 bit) data streams associated with rank_2 and rank_3. The transfers are dual data rate off the DQS clock signal.

Note that addresses of streams that share a same data bus alternate on the data bus's CA signals. That is, the command/address signaling on CA_1 for DQ_1 alternate between the address that is directed to rank_0 (base address A) and the address that is directed to rank_1 (base address B). FIG. 4c shows a synchronized read or write burst in which the first transfer for the burst that is directed to rank_0 is synchronized (or "in phase") with the first transfer for the burst that is directed to rank_1 (the base addresses for both transfers (A and B) are presented during a same DQS cycle).

In practice, however, the DIMM can execute concurrent burst reads/writes that are not synchronized (the first data transfers of both bursts of a pair of concurrently executed bursts need not occur on a same DQS cycle). Note that, in order to effect a 512 bit burst, both of the data streams 408 and 412 will consume 16 DQS clock cycles (2 transfers per DQS cycle×16 bits per transfer×16 DQS cycles per burst=512 bits per burst). Thus, FIG. 4 only shows half of the cycles needed to complete a full 512 bit burst (eight DQS cycles are shown in FIG. 4c).

FIG. 4c shows additional timing detail for both read and write activity of the DIMM. Here, note that transfers over the data bus happen at twice the rate at which the memory chips are accessed.

FIG. 5 shows a design for a memory controller that is able to communicate with a DIMM as described above. The memory controller comprises first and second memory channel interfaces 504_1, 504_2 that each comprise a pair of DQ bus interfaces and CA signal interfaces and can communicate with a DIMM as discussed above. Each interface therefore includes first and second groups of input/outputs (I/Os) to respectively couple to first and second DQ and CA wires of, e.g., a DDR5 memory channel.

As observed in FIG. 5 the memory controller receives memory read and memory write requests at input node 502. Scheduler and address mapping circuitry 503 orders and directs the requests to an appropriate memory channel interface (e.g., interface 504_1 or 504_2). Notably, each memory channel interface includes its own address mapping logic circuitry (not shown in FIG. 5 for illustrative ease) to map each request to its correct DQ bus (said another way, the correct one of DQ_1 and DQ_2). As such, with two separate DQ channels, the memory interface circuitry 504_1 itself has to map the addresses of the requests it receives to a particular one of the DQ channels.

Here, an inbound queue 505_1, 505_2 precedes each interface 504_1, 504_2 and the address mapping circuitry of an interface may pull requests out-of-order from the queue to keep both DQ channels busy (e.g., if the front of the queue contains requests that map to only one of the DQ busses, the address mapping logic may pull a request from deeper back in the queue that maps to the other DQ channel). Such pulling of requests may further take into account the desire to simultaneously transmit data between two different ranks on any particular DQ bus. For instance, as described with respect to the xLRDIMM implementation of FIG. 4b, the xLRDIMM is constructed to simultaneously transfer data between two different ranks of memory chips (a "top" group and a "bottom" group) on a same DQ bus.

Here, certain higher order bits of a request's address may map to one or the other of the DQ channels and ranks coupled to a specific DQ channel. In order to keep both ranks of both DQ busses at maximum transfer capacity when possible, the interface's address mapping logic circuitry may service requests out-of-order from the interface's queue so that requests whose addresses map to different DQ channels and different ranks that are coupled to a particular DQ channel can be serviced simultaneously on the xLRDIMM's particular DQ busses.

Likewise, the memory interface circuitry 504_1 includes a pair of multiplexer circuits 506_1 and 506_2, one for each CA bus (CA_1 and CA_2), to multiplex addresses of two different ranks to/from for a same DQ bus during a same time window (e.g., a same burst transfer window) as described above. As described above, both multiplexers 506_1, 506_2 may concurrently operate to concurrently transfer the addresses of four ranks between the interface 504_1 and the xLRDIMM it is coupled to during a same time window. Multiplexing may be done actually or logically (e.g., with store-and-forward circuitry).

Each memory interface 504_1, 504_2 also includes signal generation logic circuitry to generate the appropriate CA and DQ signals for each DIMM consistent with the teachings above. The memory controller 501 may include configuration register space (not depicted in FIG. 5 for illustrative ease) whose corresponding information is used to configure each memory interface. In an embodiment, the register space is used to define whether the memory interfaces are to operate in an xLRDIMM mode as described above, or, operate according to a DDR5 mode. If the later is specified, the xLRDIMM activity of the memory controller is disabled and data for only a single rank of memory chips is propagated on any DQ_1 or DQ_2 bus during a burst transfer.

Although discussions above has been directed to a particular DDR5 implementation specifying, e.g., number of cycles per burst transaction, number of DIMM slots per interface, 2:1 multiplexing ratio, memory chip clock being half the buffer clock, etc., it is pertinent to recognize that other embodiments may exist having different numbers for these and other features than those described above. For example, a DIMM that architecturally groups ranks in groups of four for a particular DQ bus may use a 4:1 multiplexing ratio and its memory chips may receive a DQS/4 clock. Embodiments also exist having values of M other than 64 or rank sizes other than 32.

Note also that although operations have been described with respect to a single xLDIMM, operations can simultaneously transpire on the DQ_1 and DQ_2 busses between two different xLDIMMs. That is, a first transfer over the DQ_1 bus may transpire with a first xLRDIMM that is coupled to the memory channel and a second transfer over the DQ_2 bus may transpire with a second xLRDIMM that is coupled to the memory channel. Such transfers may be of a same or different type (e.g., on transfer is a read transfer while the other is a write transfer).

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-507, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile storage 620 which may be the mass storage component of the system.

The main memory control function 617 (e.g., main memory controller, system memory controller) may be designed consistent with the teachings above describing a host side memory interface that is able to simultaneously transfer data between different ranks of memory chips through a same DQ bus of a host side memory interface during a same burst transfer to/from, e.g., an xLRDIMM as described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. An apparatus, comprising:
a memory controller comprising a memory channel interface, the memory channel interface comprising a first group of data I/Os and second group of data I/Os, the first group of data I/Os to couple to a first data bus of the memory channel interface, the second group of data I/Os to also couple to the first data bus of the memory channel interface, the memory controller comprising logic circuitry to simultaneously transfer data through the first and second group of I/Os between first and second ranks with different respective addresses during a same edge of a same data clock, where the first group of I/Os is to transfer data between the first rank and the second group of I/Os is to transfer data between the second rank.

2. The apparatus of claim 1 wherein the memory controller further comprises logic circuitry to multiplex the different respective addresses that target the first and second ranks over a same time window.

3. The apparatus of claim 1 wherein the transfers between the first and second ranks are burst transfers that are not synchronized.

4. The apparatus of claim 1 wherein the memory controller further comprises logic circuitry to move second requests that are targeted to the second rank ahead of first requests that are targeted to the first rank, the second requests received by the memory controller after the first requests, the first requests received by the memory controller after other requests were received by the memory controller, the memory controller to move the second requests ahead of the first request so that the memory controller is able to simultaneously transfer data between the first and second ranks.

5. The apparatus of claim 4 wherein the data that is transferred between the first and second ranks is sent over a same burst sequencing time window.

6. The apparatus of claim 1 wherein the memory controller comprises third and fourth groups of data I/Os for a second data bus of the memory channel interface, the memory controller to simultaneously transfer data between third and fourth ranks that are respectively coupled to the third and fourth groups of data I/Os.

7. The apparatus of claim 6 wherein the simultaneous transfer of data between the third and fourth ranks is to occur simultaneously with the transfer of data between the first and second ranks.

8. The apparatus of claim 7 wherein the memory controller comprises a multiplexer that is to multiplex addresses on the memory channel interface that target the first and second ranks while multiplexing addresses that target the third and fourth ranks.

9. The apparatus of claim 1 wherein the memory channel interface is a JEDEC DDR5 memory channel interface.

10. The apparatus of claim 9 wherein the memory controller comprises control register space to disable DDR5 operation in favor of simultaneously transferring data between the first and second ranks over the first and second group of data I/Os.

11. An apparatus, comprising:
a DIMM comprising circuitry to transfer data to different ranks of memory chips on the DIMM having different respective addresses and that were simultaneously received from a same data bus during a same clock edge of a same data clock of a same burst write sequence.

12. The apparatus of claim 11 wherein the DIMM has a memory channel interface that is compatible with a JEDEC DDR5 industry standard.

13. The apparatus of claim 11 wherein the circuitry comprises buffer circuitry to store-and-forward the data.

14. The apparatus of claim 13 wherein the buffer circuitry is to operate at a multiple of a speed of the memory chips of the different ranks.

15. The apparatus of claim 14 wherein the buffer circuitry is to transfer halves of ranks on the data bus at twice the rate at which data accesses are applied to the memory chips of the different ranks.

16. A computing system, comprising:
a plurality of processing cores;
a solid-state drive;
a system memory comprised of a first DIMM and a second DIMM;
a memory controller comprising a memory channel interface, the memory channel interface comprising a first group of data I/Os and second group of data I/Os, the first group of data I/Os to couple to a first data bus of the memory channel interface, the second group of data I/Os to also couple to the first data bus of the memory channel interface, the memory controller comprising logic circuitry to simultaneously transfer data through the first and second group of I/Os between first and second ranks with different respective addresses during a same edge of a same data clock, where the first group of I/Os is to transfer data between the first rank and the second group of I/Os is to transfer data between the second rank.

17. The computing system of claim 16 wherein the memory controller further comprises logic circuitry to multiplex the different respective addresses that target the first and second ranks over a same time window.

18. The computing system of claim 16 wherein the transfers between the first and second ranks are burst transfers that are not synchronized.

19. The computing system of claim 16 wherein the memory controller further comprises logic circuitry to move second requests that are targeted to the second rank ahead of first requests that are targeted to the first rank, the second requests received by the memory controller after the first requests, the first requests received by the memory controller after other requests were received by the memory controller, the memory controller to move the second requests ahead of the first request so that the memory controller is able to simultaneously transfer data between the first and second ranks.

20. The computing system of claim 19 wherein the data that is transferred between the first and second ranks is sent over a same burst sequencing time window.

21. An apparatus, comprising:
   a DIMM comprising circuitry to simultaneously transfer data from different ranks of memory chips on the DIMM having different respective addresses on a same data bus during a same clock edge of a same data clock of a same burst read sequence.

22. The apparatus of claim 21 wherein the DIMM has a memory channel interface that is compatible with a JEDEC DDR5 industry standard.

23. The apparatus of claim 21 wherein the circuitry comprises buffer circuitry to store-and-forward the data.

24. The apparatus of claim 23 wherein the buffer circuitry is to operate at a multiple of a speed of the memory chips of the different ranks.

* * * * *